(12) United States Patent
Chew (10) Patent No.: US 9,037,812 B2
(45) Date of Patent: May 19, 2015

(54) METHOD, APPARATUS AND SYSTEM FOR MEMORY VALIDATION

(75) Inventor: Yen Hsiang Chew, Penang (MY)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 13/997,509

(22) PCT Filed: Nov. 17, 2011

(86) PCT No.: PCT/US2011/061248
§ 371 (c)(1),
(2), (4) Date: Jun. 24, 2013

(87) PCT Pub. No.: WO2013/074107
PCT Pub. Date: May 23, 2013

(65) Prior Publication Data
US 2013/0275691 A1    Oct. 17, 2013

(51) Int. Cl.
*G06F 12/00* (2006.01)
*G06F 9/44* (2006.01)
*G06F 11/10* (2006.01)

(52) U.S. Cl.
CPC .............. *G06F 12/00* (2013.01); *G06F 9/4401* (2013.01); *G06F 11/106* (2013.01)

(58) Field of Classification Search
USPC ........................................................ 711/154
See application file for complete search history.

(56) References Cited

U.S. PATENT DOCUMENTS

| | | |
|---|---|---|
| 2004/0143696 A1 | 7/2004 | Hsieh |
| 2007/0136523 A1 | 6/2007 | Bonella et al. |
| 2008/0172740 A1* | 7/2008 | Kondo ............................ 726/22 |
| 2009/0044039 A1 | 2/2009 | Lee |
| 2010/0058041 A1 | 3/2010 | John et al. |

OTHER PUBLICATIONS

"International Search Report and Written Opinion of the ISA for International Application No. PCT/US2011/061248", (Jul. 31, 2012), Whole Document.
"International Preliminary Report on Patentability (Chapter I of the Patent Cooperation Treaty) for International Application No. PCT/US2011/061248", (May 30, 2014), Whole Document.

* cited by examiner

*Primary Examiner* — Aracelis Ruiz
(74) *Attorney, Agent, or Firm* — Blakely, Sokoloff, Taylor & Zafman LLP (57) ABSTRACT

Techniques and mechanisms for assuring that one or more addressable locations in memory of a computer platform are transitioned from potentially invalid state to known-valid state. In an embodiment, a memory validation agent separate from a processor of the computer platform performs memory validation writes in response to an indication of power state transition. In another embodiment, the memory validation agent determines information to be included in write commands which implement the memory validation, where the determining the information is decoupled from operation of the processor.

20 Claims, 6 Drawing Sheets

METHOD, APPARATUS AND SYSTEM FOR MEMORY VALIDATION

CLAIM OF PRIORITY

This application is a U.S. National Phase application under 35 U.S.C. §371 of International Application No. PCT/US2011/061248, filed Nov. 17, 2011, entitled "METHOD, APPARATUS AND SYSTEM FOR MEMORY VALIDATION," the entire contents of which are incorporated herein by reference.

BACKGROUND

1. Technical Field

Embodiments discussed herein generally relate to computer memory systems. More particularly, certain embodiments variously relate to configuration of a memory device after a power state transition.

2. Background Art

Booting up a computer platform, or otherwise transitioning the platform from a state for lower power consumption to a state for higher power consumption, often takes longer than desired. Moreover, as technological improvements continue to push for implementation of smaller platforms—e.g. for tablets and various other handheld devices—the demand for increased power efficiency and the demand for faster recovery from low power states are increasingly at odds with one another.

Consequently, delays associated with power transitions can be untenable when a device needs to be activated on an expedited basis. One constraint to provide sufficiently fast boot-up (or other power transitions) is the need to prepare volatile memory for operation after a power state which has allowed information stored in such volatile memory to degrade. After such a power state, one or more locations in the memory may be in a potentially invalid state, such as when one or more memory cells are in indeterminate logical states between logic "high" and logic "low".

Operations to assure that a memory device is in a known-valid state slow boot operations and other transitions, and for at least this reason are a constraint on the usefulness of certain computer platforms in various applications. Accordingly, there is a need for mechanisms which, for example, allow for faster boot-up or other operations associated with a power state transition of computer systems.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
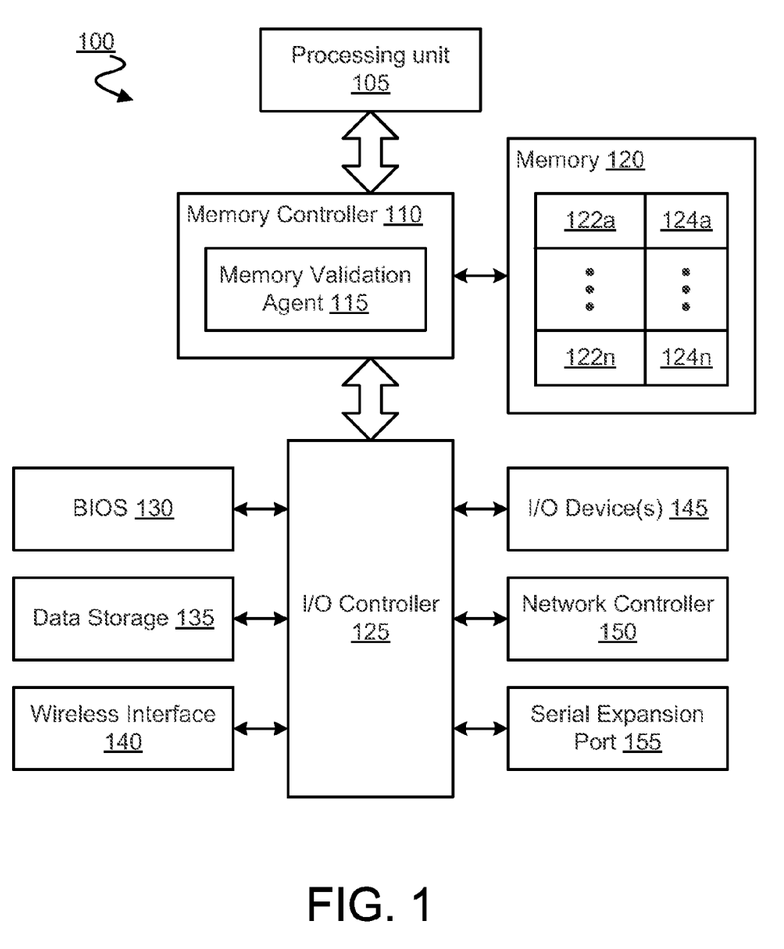
FIG. 1 is a block diagram illustrating elements of a computer platform according to an embodiment for providing memory validation.

FIG. 1 is a block diagram illustrating select elements of a computer platform 100 to provide for memory validation according to an embodiment. Computer platform 100 may include, for example, a platform of a desktop computer, a portable computer such as a laptop or handheld device—e.g. a tablet, personal digital assistant (PDA), smart phone, messaging device, digital music player, digital camera, etc.—or other such computer platform for data storing, processing, sending, receiving and/or the like.

In an embodiment, computer platform 100 includes a processing unit 105 having one or more processor cores to execute software—e.g. an operating system to implement one or more applications thereon. For example, processing unit 105 may include a central processing unit (CPU), an application-specific instruction-set processor (ASIP) or other processor to execute one or more of operating system instructions, bootup software instructions, option ROM instructions, firmware interface instructions and/or the like. By way of illustration and not limitation, a processor of processing unit 105 may execute Basic Input/Output System (BIOS) code, Extensible Firmware Interface (EFI) code such as Unified Extensible Firmware Interface (UEFI) code, and/or other firmware interface instructions. Any of a variety of types of firmware interface code, operating system code, application code, etc.—consistent with the techniques discussed herein—may executed by processing unit 105.

Computer platform may include a memory 120 coupled to processing unit 105—e.g. via a memory controller 110—where memory 120 stores instructions or other data in support of software execution by processing unit 105. Memory 120 may, for example, include any of a variety of combinations of one or more volatile memory devices. By way of illustration and not limitation, memory 120 may include random access memory (RAM) such as one or more of dynamic RAM (DRAM), static RAM (SRAM) such as double data rate (DDR) SDRAM and/or the like. Memory 120 may, for example, include one or more dual in-line memory module (DIMM) devices, although certain embodiments are not limited in this regard.

In an embodiment, memory 120 includes a plurality of addressable locations 122a, . . . , 122n to store information—e.g. instructions, data, address information and/or the like—for access by processing unit 105. Addressable locations 122a, . . . , 122n may, for example, be configured to store information representing state of one or more software processes to be executed by processing unit 105.

Some or all of addressable locations 122a, . . . , 122n may each include, or otherwise correspond to, respective error correction locations 124a, . . . , 124n of memory 120, although certain embodiments are not limited in this regard. Error correction locations 124a, . . . , 124n may each be available to store a respective error correction code (ECC) or other error correction value—e.g. a parity bit, a checksum, a hash value, and/or the like—for information stored in a corresponding one of addressable locations 122a, . . . , 122n. It is understood that memory 120 may include any of a variety of additional or alternative addressable locations (and/or error correction locations) not shown in FIG. 1.

At certain times, computer platform 100 may variously operate in one or more power states—e.g. a powered off state, a hibernate state, a sleep state, etc.—which allow for the degradation of some or all data stored in memory 120. In such a power state, for example, one or more memory refresh mechanisms, error detection mechanisms, error correction mechanisms, and/or the like may be disabled for the purpose of reducing power consumption of computer platform 100. Consequently, when computer platform 100 transitions out of such a power state—e.g. by powering up or waking computer platform 100—to a power state which supports operation of such mechanisms, data stored in memory 120 may have lost some or all of its integrity. For example, information in addressable locations 122a, . . . , 122n and/or in error correction locations 124a, . . . , 124n may be in an indeterminate state, may have errors from which computer platform 100 cannot recover, may have errors which pose a large error correction overhead, and/or the like.

In an embodiment, computer platform 100 includes one or more mechanisms to write over some or all information in addressable locations 122a, . . . , 122n—e.g. as part of a transition from such a power state—the writing to replace potentially degraded information in memory with information which is known to be valid (referred to herein as "known-valid information").

For brevity, writing over potentially invalid information in a memory with known-valid information is referred to herein as "memory validation". Although the term "memory scrubbing" alternatively describes such writing, that term has also been used in the past to refer to techniques which read information and correct errors detected in the read information. By contrast, certain embodiments discussed herein do not require actual reading of information which is to be written over, or the evaluation or correction or errors in such read information.

In an embodiment, computer platform 100 includes a memory validation agent 115 including logic to perform memory validation for some or all of addressable locations 122a, . . . , 122n. Memory validation agent 115 may reside outside of processing unit 105. By way of illustration and not limitation, memory validation agent 115 may reside within memory controller 110. In certain embodiments, memory validation agent 115 and/or memory controller 110 may reside within an integrated circuit (IC) package or other component device of computer platform 100—e.g. a system-on-chip (SoC) device—which includes processing unit 105. In such a device, memory validation agent 115 may be distinct from one or more processor cores of processing unit 105—e.g. distinct from all processor cores of such a component device—which are to perform a boot-up process, a host OS process or other initialization process which supports computer platform 100 transitioning out of a low power state. It is understood that any of a variety of architectures may couple memory validation agent 115 to processing unit 105, according to different embodiments.

In an embodiment, memory validation agent 115 includes any of a variety of combinations of hardware, software and/or firmware to perform a plurality of writes each to a respective one of addressable locations 122a, . . . , 122n. For example, memory validation 115 may include a state machine or other hardware engine to generate a plurality of write commands for writing to respective locations of memory 120. Alternatively or in addition, memory validation agent 115 may include a co-processor, microcontroller, or other agent to generate such write commands. In an embodiment, memory validation agent 115 includes a DFX (Design for X, where X is some built-in design, test, validation or other functionality) module dedicated to implementing memory validation decoupled from processor operation.

Memory validation operations by memory validation agent 115 may be in response to a signal—e.g. a message from processing unit 105—indicating a transition of computer platform 100 from a power state which allows for the degradation of data in addressable locations 122a, . . . , 122n. Detection of the signal may take place after, during or even before the transition takes place. In an embodiment, a power state transition to activate one or more mechanisms to maintain data integrity in addressable locations 122a, . . . , 122n and (optionally) in error correction locations 124a, . . . , 124n may be one component of a larger, platform-wide power state transition.

In an embodiment, memory validation operations by memory validation agent 115 may include performing an earliest write to addressable locations 122a, . . . , 122n subsequent to the transition from such a power state.

The generating of such write commands by memory validation agent 115 may be independent of processing unit 105 in one or more respects. More particularly, operations by memory validation agent 115 to implement memory validation may be decoupled from concurrent operation of processing unit 105. By way of illustration and not limitation, memory validation agent 115 may determine that memory validation is to be performed for addressable locations 122a, . . . , 122n, where the determining is independent of processing unit 105 specifying to memory validation agent 115 each of—or in an embodiment, any of—the particular addressable locations for which memory validation is to be performed. For example, memory validation agent 115 may generate or otherwise determine multiple memory addresses for which memory validation is to be performed, where such generating/determining is independent of any specific addressing information communicated by processing unit 105 since the power state transition in question. Alternatively or in addition, memory validation agent 115 may generate or otherwise determine one or more values to be written to addressable locations 122a, . . . , 122n, where the generating/determining such one or more values is independent of processing unit 105 specifying to memory validation agent 115 any such values—e.g. at least since the power state transition in question.

In certain embodiments, memory validation agent 115 may perform memory validation in response to communication from processing unit 105 only where any such communications is generic to all of the addressable locations 122a, . . . , 122n. For example, memory validation may be independent of any such communications providing information (address, data, instruction, and/or the like) which is specific to a particular one of addressable locations 122a, . . . , 122n.

Memory validation may be in preparation for a loading of software instructions and/or software state information into addressable locations 122a, . . . , 122n. In an embodiment, a memory validation process writes placeholder information into addressable locations 122a, . . . , 122n—e.g. where such placeholder information does not itself correspond to any code to be executed by processing unit 105. The writing of such placeholder information may reduce the likelihood that any bits in addressable locations 122a, . . . , 122n are in a logically indeterminate state. For example, writing such placeholder information may assert a logical "1" or a logical "0" to a bit which previously had a level of charge between a threshold level for a logical "1" value and a threshold level for a logical "0" value. Alternatively or in addition, the writing of such placeholder information may include writing error correction information which corresponds to, and is correct for, other placeholder information written by memory validation. Accordingly, information being written to memory 120 may be said to be known-valid at least insofar as such information clearly represents Boolean logical states. In certain embodiments, known-valid information includes information which has, or corresponds to, error correction information which is accurate for other known-valid information.

In an embodiment, memory validation is performed in preparation for an earliest loading of software instructions, state etc. into addressable locations $122a, \ldots, 122n$ since the transition from the power state which allowed data degradation in memory 120. For example, code for a BIOS code 130 of computer platform 100 may be loaded into memory 120 after memory validation. In an embodiment, BIOS 130 is stored in a non-volatile storage of computer platform 100, such as an electrically erasable programmable read-only memory (EEPROM) or other read-only memory, a NAND flash or other flash device, and/or the like. In an embodiment, any of a variety of additional or alternative software may be loaded after memory validation including, but not limited to, one or more of bootup software, EFI or other firmware interface software, operating system, etc.

In addition to the features discussed above, computer platform 100 is shown including additional elements, discussed below, which are not limiting on memory validation mechanisms and/or techniques of certain embodiments. One of ordinary skill in the art would understand from the discussion herein that computer platform 100 may include any of a variety of such additional elements (discussed below), according to different embodiments.

Computer platform 100 may include any of a variety of devices for exchanging information with processing unit 105 and/or memory 120. By way of illustration and not limitation, computer platform 100 may include an I/O controller 125 coupled to memory controller 110, where BIOS 130 (or various other such software) may be loaded into memory 120 via I/O controller 125 and memory controller 110. Alternatively or in addition, I/O controller 125 may couple to one or more other components of computer platform 100 to processing unit 105 and/or memory 120. By way of illustration and not limitation, I/O controller 125 may control input to and/or output from a data storage 135—e.g. one or more of a solid state drive (SSD), a hard disk drive (HDD) and/or the like. Data storage 135 may include one or more of NAND flash memory media, NOR flash memory media, magneto-resistive random access memory media, nanowire memory media, phase-change memory media and/or the like. In an alternate embodiment, BIOS 130 (or other such software) may be stored in data storage 135.

I/O controller 125 may control input to and/or output from a network interface such as a wireless interface 140. Wireless interface 140 may include any of a variety of combinations of circuit logic to operate one or more wireless channels—e.g. for communications between computer platform 100 and a network (not shown) coupled thereto. By way of illustration and not limitation, wireless interface 140 may implement network communications according to a Institute of Electrical and Electronics Engineers (IEEE) 802.11 WLAN standard, an IEEE 802.16 Wireless Broadband standard, and/or the like. Wireless interface 140 may include, or couple to, one or more antenna (not shown) for implementing such wireless communications.

Alternatively or in addition, I/O controller 125 may control input to and/or output from one or more other input/output devices 145—e.g. for interaction by a local user of computer platform 100. By way of illustration and not limitation, one or more other input/output devices 145 may include one or more of a mouse, keyboard, speaker, monitor, touchpad, touchscreen and/or the like. Alternatively or in addition, I/O controller 125 may control input to and/or output from a network controller 150 (such as a network interface card) for communication via a wired connection to a network, a serial expansion port 155 which supports communication with a Universal Serial Bus (USB) or other peripheral device, and/or the like.

Figure 2A:
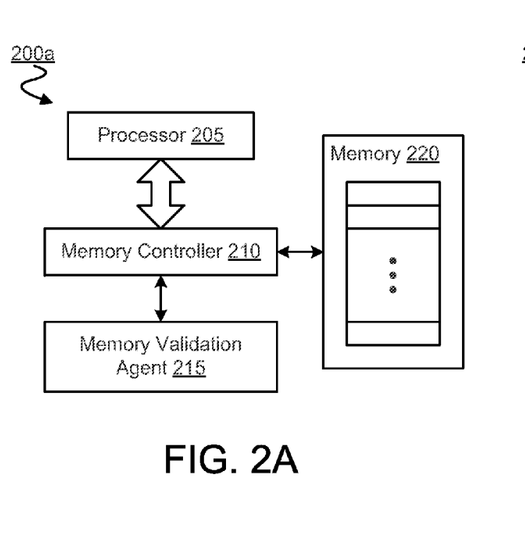
FIGS. 2A-2C are block diagrams illustrating elements of various architectures for providing memory validation according to respective embodiments.
Figure 2B:
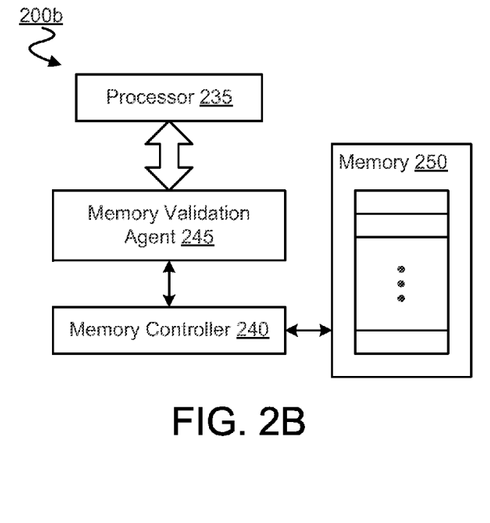
Figure 2C:
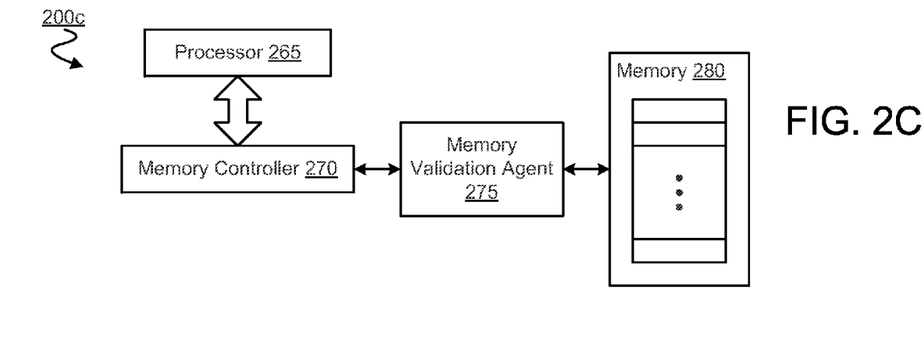

FIGS. 2A and 2C illustrate different respective architectures $200a, 200b, 200c$ for providing memory validation according to various embodiments. FIG. 2A show an architecture $200a$ in which a processor 205 is coupled to a memory 220 via a memory controller 210, where a memory validation agent 215 of architecture $200a$ is external to memory controller 210. In architecture $200a$, memory controller 210 is coupled to processor 205, memory 220 and memory validation agent 215, each via separate respective communication paths. In an embodiment, the various functionality of processor 205, memory 220, memory controller 210 and memory validation agent 215 may correspond, respectively, to the various functionality of processor 105, memory 120, memory controller 110 and memory validation agent 115.

FIG. 2B show an architecture $200b$ in which a processor 235 is coupled to a memory 250 via a memory controller 240, where a memory validation agent 245 of architecture $200b$ is external to memory controller 240. In architecture $200b$, memory validation agent 245 is coupled between memory controller 240 and processor 235. In an embodiment, the various functionality of processor 235, memory 250, memory controller 240 and memory validation agent 245 may correspond, respectively, to the various functionality of processor 105, memory 120, memory controller 110 and memory validation agent 115.

FIG. 2C show an architecture $200c$ in which a processor 265 is coupled to a memory 280 via a memory controller 270, where a memory validation agent 275 of architecture $200c$ is external to memory controller 270. In architecture $200c$, memory validation agent 275 is coupled between memory controller 270 and memory 280. In an embodiment, the various functionality of processor 265, memory 280, memory controller 270 and memory validation agent 275 may correspond, respectively, to the various functionality of processor 105, memory 120, memory controller 110 and memory validation agent 115.

As with memory validation agent 115, any of memory validation agents 215, 245, 275 may be incorporated into a component device—e.g. SoC hardware or other such IC package—along with a corresponding one of memory controllers 210, 245, 270 and/or a corresponding one of processors 205, 235, 265. In such an instance, the memory validation agent may be distinct from some or all processor cores of the component device—e.g. distinct from a core which is to perform a boot-up or host OS process for platform initialization in support of a power state transition.

Figure 3:
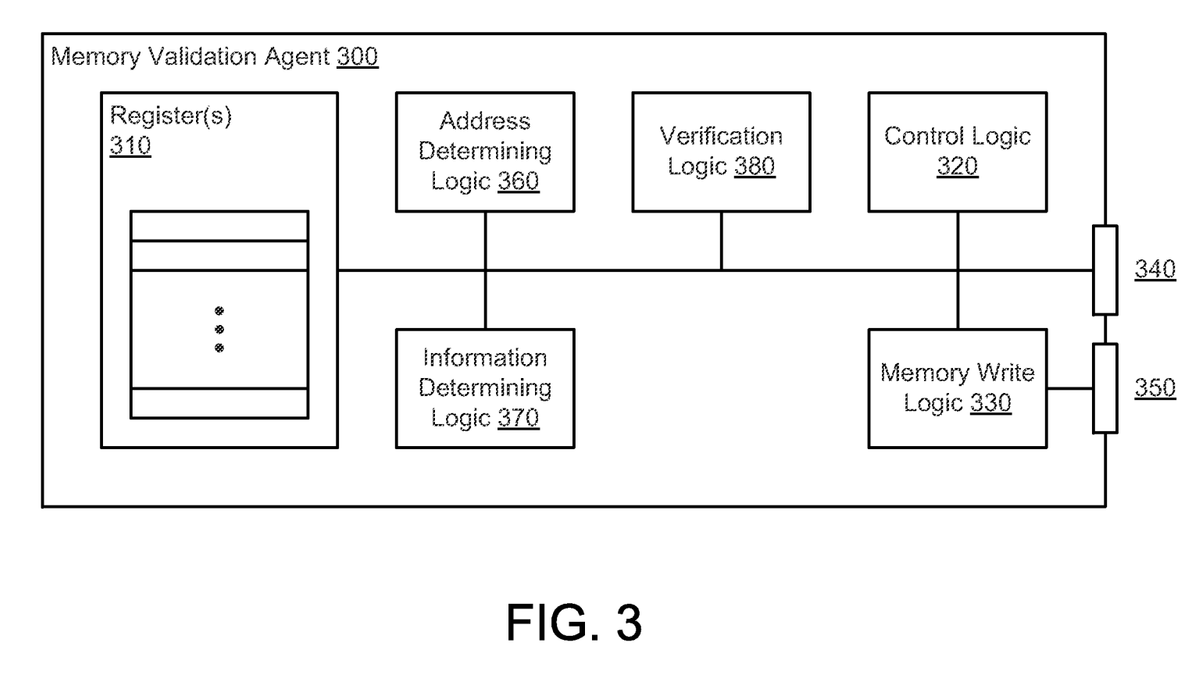
FIG. 3 is a block diagram illustrating elements of a memory validation agent to perform memory validation according to an embodiment.

FIG. 3 illustrates certain elements of a memory validation agent 300 according to an embodiment for writing over potentially invalid information in a memory with known-valid information. In an embodiment, memory validation agent 300 includes some or all of the features of memory validation 115. For example, memory validation agent 300 may perform one or more memory validation writes in a system including some or all of the features of computer platform 100.

Certain features of the illustrative memory validation agent 300 are discussed herein in relation to performing memory validation of memory 120—e.g. by writing known-valid information to one or more of the plurality of addressable locations $122a, \ldots, 122n$ (and, in certain embodiments, to respective ones of error correction locations $124a, \ldots, 124n$). One of ordinary skill in the art would appreciate from the instant disclosure that such discussion may be extended to apply to any of a variety of one or more additional or alternative memory devices of a computer platform, according to different embodiments.

Memory validation agent 300 may include control logic 320—e.g. a state machine or other circuit logic—to determine whether and/or how memory validation writes to memory 120 are to be performed. By way of illustration and not limitation, control logic 320 may detect a message provided to memory validation agent 300, the signal indicating a transition of the computer platform from a power state during which information in memory 120 is allowed to degrade. Such a signal may be provided, for example, via a first interface 340 of memory validation agent 300—e.g. where the signal is sent directly or indirectly from processing unit 105.

Additionally or alternatively, memory validation agent 300 may include memory write logic 330 coupled to control logic 320. In response to detecting an indication of the power state transition, control logic 320 may direct memory write logic 330 of memory validation agent 300 to communicate various write commands. In an embodiment, memory write logic 330 includes circuit logic to generate write commands—e.g. for sending via an interface 350 of memory validation agent—the write commands to variously specify to memory 120 the storing of known-valid information in respective ones of the plurality of addressable locations 122a, ..., 122n. The particular format of such write commands may be according to any of a variety of conventional formats, and is not limiting on certain embodiments. Interface 340 and interface 350 may be same interface, although certain embodiments are not limited in this regard. As shown in FIG. 1, memory validation agent 300 may, in an embodiment, reside inside a memory controller unit whereby it may utilize memory write logic and other relevant logic of the memory controller to perform its validation activities, without the need for logic replication. Accordingly, some of the features of memory validation agent 300—e.g. memory write logic 330, first interface 340 and/or second interface 350—may be shared with other logic of such a memory controller.

In an embodiment, a plurality of write commands separately sent by memory write logic 330 are in response to the same detected signal indicating to control logic 320 the power state transition. Such a plurality of writes may, for example, include an earliest write to the plurality of addressable locations 122a, ..., 122n to take place since the indicated transition from the power state.

Memory validation agent 300 may include, and/or couple to, logic to generate information which is to be included in the write commands sent by memory write logic 330. By way of illustration and not limitation, memory validation agent 300 may include, or couple to, information determining logic 370 comprising a random number generator or other logic to create information—e.g. default value or other place-holder information—the writing of which is to bring one or more of the plurality of addressable locations 122a, ..., 122n and/or one of the one or more of the plurality of error correction locations 124a, ..., 124n to a known-valid state. In an embodiment, memory validation agent 300 may further include or couple to logic—e.g. in information determining logic 370—to generate error correction values for information written to the plurality of addressable locations 122a, ..., 122n. By way of illustration and not limitation, memory validation agent 300 may include or have access to logic to perform parity, hash or other operations on information generated with information determining logic 370.

Write commands sent by memory write logic 330 may include a command to write some given value to bring an addressable location in memory to a known-valid state, where, in an embodiment, that command (or some other command sent by memory write logic 330) further writes to the memory 120 error correction information which is accurate for that given value.

Alternatively or in addition, memory validation agent 300 may include, or couple to, address determining logic 360 comprising circuitry or other logic to provide to memory write logic 330 respective addresses for various ones of the plurality of addressable locations 122a, ..., 122n. Memory write logic 330 may variously combine information provided by information generation logic 370 with respective ones of addresses provided by address determining logic 360 to generate a plurality of write commands. Memory write logic 330 may subsequently communicate such write commands to memory 120—e.g. to bring respective ones of the plurality of addressable locations 122a, ..., 122n each to a known-valid state. Accordingly, although generating the write command information—and the write commands including such write command information—may be in response to control logic 320 detecting the power state transition, such responsive generating may itself be implemented independent of any communication of such write command information by the processor of the computer platform. In at least this sense, memory validation may be said to be decoupled from processor operations.

Memory validation agent 300 may include or have access to one or more registers 310 to aid in implementing some or all of the above-described memory validation functionality. By way of illustration and not limitation, one or more registers 310 may include a register which is dedicated to operate as a flag for the power state transition. In an embodiment, the processor, a power management unit or some other agent of the computer platform may write a value to such a flag register for the purpose of indicating the transition of the platform from a particular low power state. Control logic 320 may, for example, automatically trigger a memory validation sequence in response to such writing to the flag register, the memory validation sequence to transition some or all of a memory device from potentially invalid state to known-valid state. In an embodiment, such a flag register may be automatically reset to some default value after control logic 320 detects the write to the flag register. Resetting the flag register may prepare memory validation agent 300 for detecting a subsequent transition from a power state which allows information in memory to degrade.

Alternatively or in addition, one or more registers 310 may include reference information with which address determining logic 360 generates addresses to be provided to memory write logic 330. By way of illustration and not limitation, the one or more registers 310 may include information identifying or otherwise describing one or more memory devices, one or more memory blocks (e.g. memory pages, etc.), a size of an addressable location, a first address and a last address of a memory block, a first address and a size of a memory block, and/or the like. In an embodiment, some or all of such reference information may be provided to one or more registers 310 prior to the power state transition which is detected by control logic 320. In an alternate embodiment, such reference information may be provided to one or more registers 310 after the power state transition—e.g. after a system power-on or when the system exits from a deep sleep state, where all registers 310 were previously cleared due to power being removed from them during the previous low power state. The processor may proceed to reconfigure one or more registers 310 before issuing a command to perform memory validation—e.g. through setting a "start test" flag in one or more registers 310. In such an alternative embodiment, memory validation unit 300 nevertheless generates individual write commands for implementing memory validation without the aid of the processor after the "start test" flag is set.

Address determining logic 360 may parse or otherwise process such information in one or more registers 310 to derive, for example, a plurality of addresses in an address range, each address for a different location in one or more memory devices. In addition, one or more registers 310 may include reference information with which information determining logic 370 generates data values to be provided to memory write logic 330. By way of illustration and not limitation, the one or more registers 310 may include information identifying or otherwise describing one or more data values, one or more sequences of data values, one or more rules or specifications for generating data values and/or the likes. For example, data values provided to memory write logic 330 may be generated based on memory addresses—e.g. using a functional mapping or hashing of a memory address, by counting up from an initial seed value, and/or the like. In addition, one or more registers 310 may include flags and reference information with which verification logic 380 of memory validation agent 300 may optionally read back and validate data values written to memory by memory write logic 330. By way of illustration and not limitation, user may optionally set a flag value in registers 310 to enable verification logic 380 to read back and verify that all data values written to memory 120 by memory write logic 330 including their corresponding error correction values are correct and consistent. In certain embodiments, memory validation agent 300 does not include the functionality of verification logic 380.

In an embodiment, memory validation agent 300 may be optionally enabled or disabled by a user—e.g. through a setting of a flag in one or more registers 310—to read back and verify that data was correctly written to memory by a memory validation write. Such memory verification may, for example, be used to test for memory integrity—i.e. to assure that a memory location is still in good operating condition—after transitioning from a low power state. For example, memory validation may include performing data writes in a deterministic (not random) fashion—e.g. by accessing information describing a deterministic process for determining address and/or data information—where such data can be verified using a predefined algorithm. By way of illustration and not limitation, each of multiple address locations may be written to with a respective data value that corresponds to a functional mapping of that memory address—e.g. in a simple case, where value 0x0 is written to memory location 0x0, value 0x4 is written into memory location 0x4, . . . , value 0xN is written to memory location 0xN, etc. During a subsequent memory verification stage, the expected data values may be recomputed by memory validation agent 300 using the same functional mapping algorithm, and subsequently compared against actual values read from memory for each address of the multiple address locations.

In an embodiment, memory validation agent 300 includes circuit logic—e.g. in control logic 320—to interrupt or otherwise signal to a processor such as that of processing unit 105 that memory validation is complete. Prior to such an interrupt, memory validation operations by memory validation agent 300 may take place in parallel with decoupled operations of the processor that do not require access to memory. Such an interrupt signal may, for example, enable the processor to perform other processing tasks in parallel with memory validation while waiting for memory validation to complete—e.g. without the processor having to constantly poll memory validation agent 300 for its completion status. In an embodiment, a user may be able to selectively configure memory validation agent 300 to provide such an interrupt after all memory validation writes (and, optionally, all memory verifications) are complete.

Figure 4:
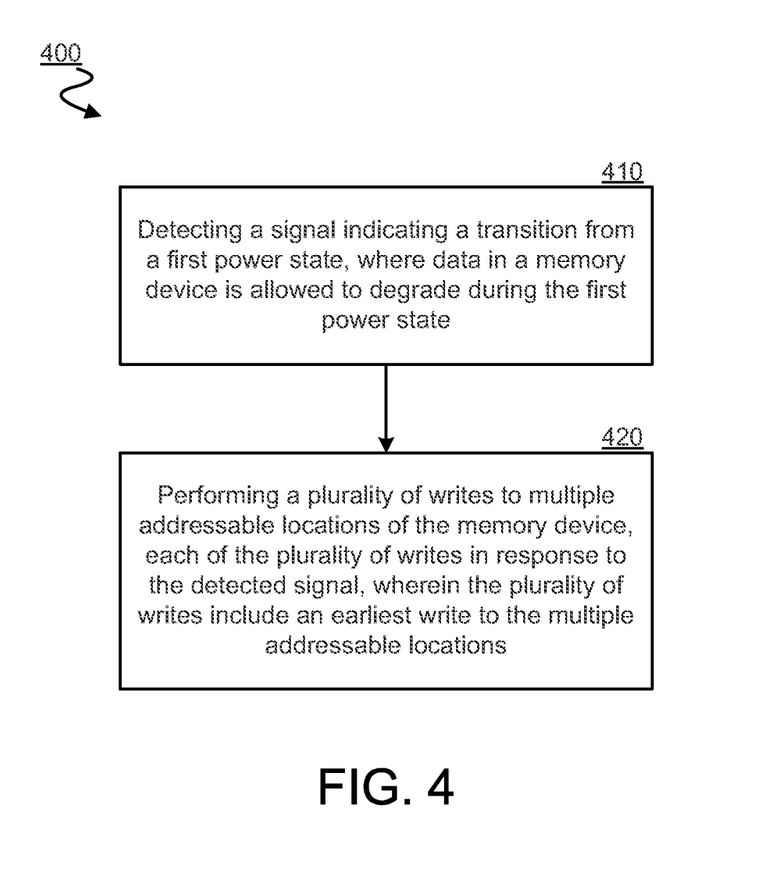
FIG. 4 is a flow diagram illustrating elements of an algorithm for a memory validation agent to perform writes to a memory according to an embodiment.

FIG. 4 is a flow diagram illustrating certain elements of a method 400 for providing memory validation according to an embodiment. Method 400 may, for example, be performed at an agent having some or all of the features of memory validation agent 300—e.g. at an agent of a computer platform which is separate from a processor of that computer platform. In an embodiment, method 400 provides for memory validation in a system such as computer platform 100.

Method 400 may include, at 410, the memory validation agent detecting a signal indicating a transition of the computer platform from a first power state, where data in a memory device of the computer platform is allowed to degrade during the first power state. The detected signal may, for example, be directly or indirectly provided by external logic of a memory controller, by the processor, by a power management unit, and/or by some other agent of the computer platform.

In response to the detected signal, method 400 may, at 420, perform a plurality of writes to multiple addressable locations of the memory device. The plurality of writes at 420 may, for example, write over any and all potentially invalid information in multiple addressable locations of one or more memory devices. For example, the plurality of writes at 420 may write over memory cells which previously were potentially in an indeterminate logical state. In certain embodiments, the plurality of writes at 420 may further write an error correction value which corresponds to, and is accurate for, other information that is also written to memory by the plurality of writes at 420.

Each of the plurality of writes at 420 may, for example, be in response to the signal detected at 410. For example, the signal detected at 410 may cause the agent to automatically generate multiple write commands, each write command for a respective one of the plurality of writes. Generation of such multiple write commands may include the agent generating or otherwise determining write command information which is to be variously included in respective ones of the multiple write commands.

In an embodiment, generating or otherwise determining such write command information may be independent, in one or more regards, of at least certain types of communication from the processor. By way of illustration and not limitation, the agent may determine such write command information independent of any communication from the processor—e.g. at least any communication which is subsequent to the indicated power state transition—which specifies particular information to be written to assure memory validation of an addressable location in memory. Alternatively or in addition, the agent may determine such write command information independent of any communication from the processor—e.g. at least any communication which is subsequent to the indicated power state transition—which specifies an address of a location in memory to which information to be written for memory validation. In an embodiment, write command information may be determined based on reference information which is stored in a repository—such as the one or more registers 310, for example—accessible to control logic of the agent independent of the processor of the computer platform. In an embodiment, some or all of such reference information may be provided to the repository prior to the power state transition which is detected at 410.

In an embodiment, the plurality of writes at 420 may include an earliest write to the multiple addressable locations. By way of illustration and not limitation, the plurality of writes at 420 may be performed to initialize the memory for a subsequent loading of one of firmware interface code, option ROM code, boot code, operating system code and/or the like.

For one or more of the plurality of writes at 420, the memory validation agent may forego reading back from memory the information written thereby—e.g. where such readback operations are otherwise performed to validate the success of such writes. For example, the memory validation agent may include in one of the plurality of writes at 420 an indication that the memory is to avoid a reciprocal communication to implement such a readback. Alternatively or in addition, the memory validation agent may determine to forego sending a message which explicitly requests such a reciprocal communication to implement a readback.

One of ordinary skill in the art would appreciate from the discussion herein that certain embodiments variously include a reciprocal method to that of method 400, where such reciprocal method is performed by an agent—e.g. the central processing unit—to send to the memory management agent the signal which is detected by method 400 at 410. Such a reciprocal method may, for example, be performed by software instructions being executed by the processor. Elements of FIGS. 5 and 6, discussed below, illustrate features of two such reciprocal methods. It is understood that any of a variety of other methods may be performed according to different embodiments—e.g. by any of a variety of other platform agents.

Figure 5:
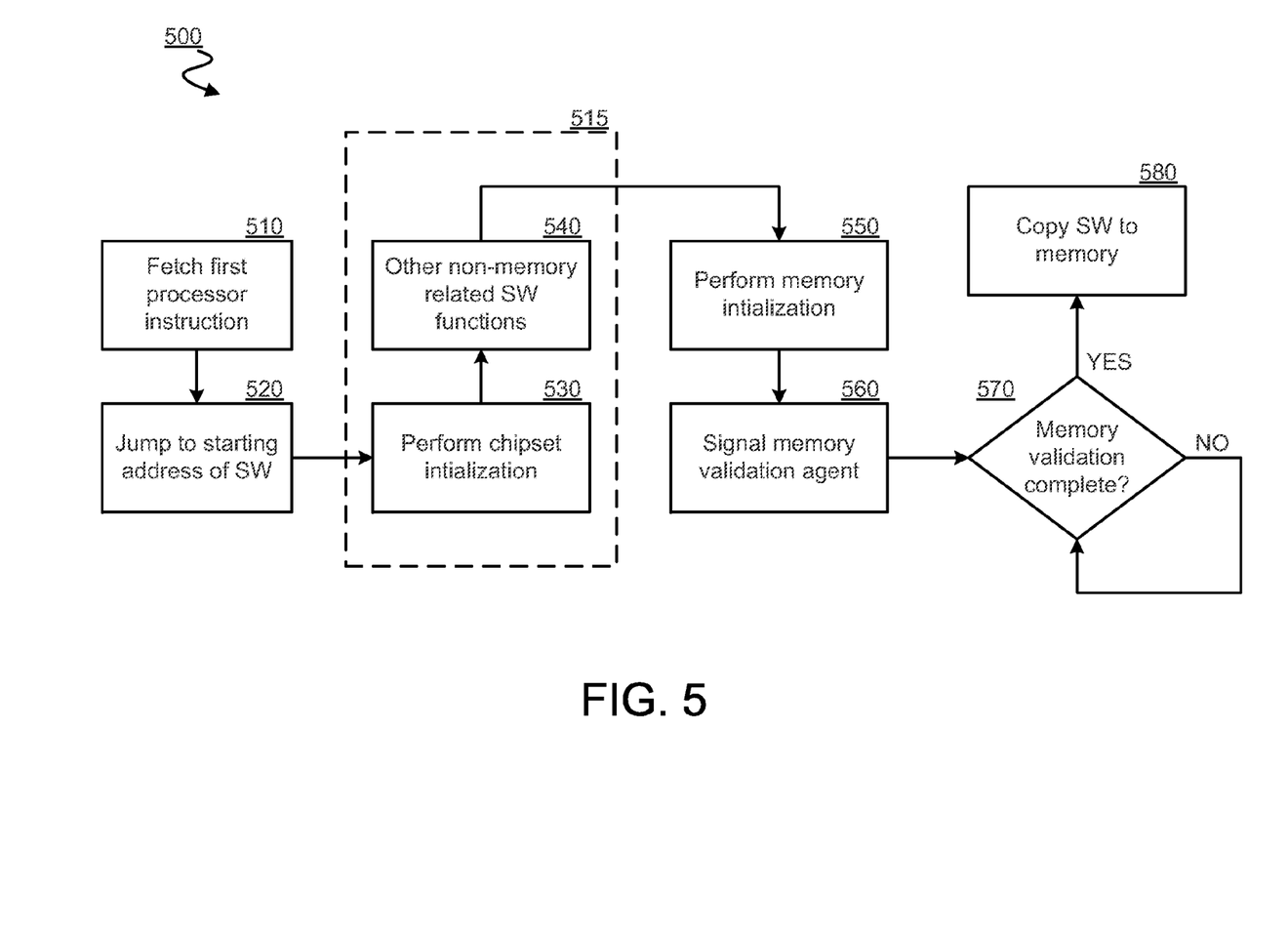
FIG. 5 is a flow diagram illustrating elements of an algorithm for loading software code into validated memory according to an embodiment.

FIG. 5 is a flow diagram illustrating a method 500 for loading software instructions into a validated memory according to an embodiment. Method 500 may, for example, be performed by a system having some or all of the features of computer platform 100.

In an embodiment, method 500 is performed as part of a boot up, wake up or other process of the computer platform which includes transitioning a memory from a particular power state. During such a power state, information stored in a volatile memory of the computer platform may be allowed to degrade. By way of illustration and not limitation, such a power state may include an inactive refresh mechanism which otherwise maintain charge levels in memory cells of one or more memory devices. Alternatively or in addition, such a power state may include inactive error detection and/or error correction mechanisms which otherwise assure that parity values, hash values and or other error correction values are kept up-to-date for corresponding information stored in memory.

Method 500 may include, at 510 a processor of the platform—e.g. in processing unit 105—fetching a first instruction since a power up event. Method 500 may include additional operations (not shown) prior to fetching 510, such as one or more processor initialization operations to take the processor out of reset, to make sure power rails are stable, to configure one or more registers of the processor, and/or the like.

The fetch at 510 may, for example, be for the first line of code that the processor will fetch in response to a RESET event, such as a user hitting a "Reset" or other such button to trigger a power transition. By way of illustration and not limitation, the first instruction may be fetched at 510 from some pre-defined address (e.g. 0xFFFF0) of an EEPROM, flash drive or other non-volatile storage device of the computer platform. For example, the processor may be hardwired or otherwise configured to fetch the first instruction by default from a storage location having the pre-defined address. In an embodiment, the first processor instruction at 510 defines or otherwise determines a jump to software to be executed by the processor. Certain embodiments are not limited to the particular type of software—e.g. firmware interface code, OS code, remote boot code or other instructions—which is to be executed by the processor.

Based on the first processor instruction, method 500 may, at 520, implement a jump to a starting address of software. However, certain embodiments are not limited in this regard. For example, the starting address of such software may, in another embodiment, be stored in the instruction fetched at 510. The processor may at least initially retrieve instructions for such software from non-volatile storage—e.g. prior to some addressable locations in a memory device of the computer platform being placed in a known-valid state.

Subsequent to jumping to the starting software address at 520, one or more operations 515 of method 500 may be performed—e.g. in response to the processor executing instructions of such software. The subsequent operations 515 may include performing initialization operations 530 for one or more chipset components—e.g. other than a memory device—of the computer platform. Additionally or alternatively, subsequent operations 515 may include, at 540, performing one or more other non-memory related software functions. Features of operations 515 are merely illustrative, and are not limiting on certain embodiments.

Method 500 may further include, at 550, performing a memory initialization in preparation for transitioning one or more addressable memory locations from potentially invalid state to known-valid state. Memory initialization 550 may include, for example, determining that communication between a memory validation agent and a memory device are enabled, that power delivery to the memory validation agent and/or the memory device is stable and making sure that any other requirements for beginning reads and/or writes to the memory device are met.

After the initialization at 550, method 500 may, at 560, signal the memory validation agent with some indication of a transition to a power state which maintains the integrity of information stored in a memory device. In response, the memory validation agent begins memory validation operations—e.g. according to some or all of the features of method 400. Conventional system power-up sequences rely upon a platform processor to generate and communicate write commands to perform memory validation. However, such an approach takes up processor cycles to implement such memory validation. Moreover, before information from the processor can reach the memory device, it may have to go through the processor's own cache and/or one or more intermediary communication buses. Moreover, a memory controller unit often must first intercept the processor write commands before writing to the memory device itself. By contrast, a memory validation module may have a comparatively shorter communication path to the memory device, and may free up processor cycles for one or more other initialization processes.

After memory validation has commenced, method 500 may perform a test at 570 to check for an end to such memory validation operations. The test at 570 may be repeated in response to a test result indicating that memory validation has not yet completed. In an alternate embodiment, a signal or an interrupt may be provided by the memory validation agent without a software process having to poll for completion of memory validation operations. After detecting from test 570 an indication that memory validation has been completed, method 500 may, at 580, copy one or more software instructions into memory—e.g. into locations which have been transitioned from potentially invalid state to known-valid state.

After being copied into memory at 580, software instructions—e.g. firmware interface code, OS code, boot code and/or the like—is available for much faster access by the processor, as compared to the processor retrieving such instructions from non-volatile storage.

Figure 6:
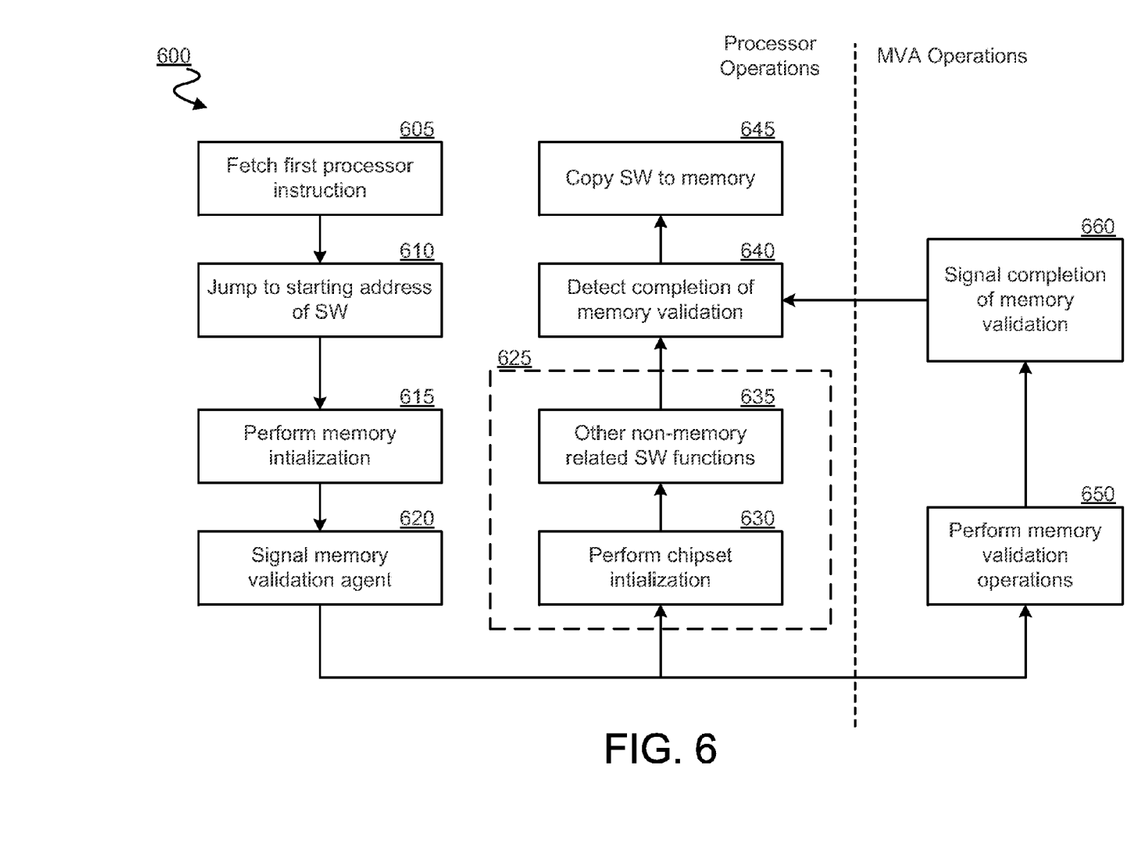
FIG. 6 is a flow diagram illustrating elements of an algorithm for loading software code into validated memory according to an embodiment.

FIG. 6 is a flow diagram illustrating a method 600 for loading software instructions into a validated memory according to an embodiment. Method 600 may, for example, be performed by a system having some or all of the features of computer platform 100.

In an embodiment, method 600 is performed as part of a boot up, wake up or other process which includes transitioning a memory from a particular power state. During such a power state, information stored in a volatile memory of the computer platform may be allowed to degrade.

Method 600 may include, at 605, a processor of the platform—e.g. in processing unit 105—fetching a first instruction since a power up event. Method 600 may include additional operations (not shown) prior to fetching 605, such as one or more processor initialization operations to take the processor out of reset, to make sure power rails are stable, to configure one or more registers of the processor, and/or the like.

The fetch at 605 may, for example, be for the first line of code that the processor will fetch in response to a RESET event, such as a user hitting a "Reset" or other such button to trigger a power transition. Based on the first processor instruction, method 600 may, at 610, implement a jump to a starting address of software. However, certain embodiments are not limited in this regard. For example, the starting address of such software may, in another embodiment, be stored in the instruction fetched at 605. The processor may at least initially retrieve some instructions for such software from non-volatile storage—e.g. prior to some addressable locations in a memory device of the computer platform being placed in a known-valid state.

Subsequent jumping to the starting software address 610, method 600 may, at 615, perform a memory initialization in preparation for transitioning one or more addressable memory locations from potentially invalid state to known-valid state. In an embodiment, memory initialization 615 is commenced before other initialization operations—e.g. before initialization of any chipset components (for example, components other than the memory device in question). Memory initialization 615 may include, for example, determining that communication between a memory validation agent and a memory device are enabled, that power delivery to the memory validation agent and the memory device is stable and/or making sure that any other conditions for beginning writes to the memory device are met. After the initialization at 615, method 600 may, at 620, signal the memory validation agent with some indication of a transition to a power state which will maintain the integrity of information stored in a memory device. In response, the memory validation agent (MVA) may perform, at 650, memory validation operations—e.g. according to some or all of the features of method 400.

The performance of memory valid operations at 650 may, for example, be decoupled from operations of the processor which follow the signaling of the memory validation agent at 620. By way of illustration and not limitation, method 600 may include one or more operations 625 being performed by the processor—e.g. in response to the processor executing instructions it retrieves from non-volatile storage. Operations 625 may, for example, include performing initialization operations 630 for one or more chipset components of the computer platform—e.g. components other than the memory device being validated at 650. Initialization operations 630 may, for example, include a host processor setting or otherwise determining configuration of a USB controller, Peripheral Component Interconnect (PCI) and/or PCIe controller, Serial Advanced Technology Attachment (SATA) controller, network controller and/or the like. Additionally or alternatively, subsequent operations 625 may include, at 635, performing one or more other non-memory related software functions. Operations 625 are merely illustrative, and are not limiting on certain embodiments.

After memory validation by the memory validation agent has commenced, method 600 may determine at 640 for an end to such memory validation operations. The determining at 640 may, for example, include repeatedly testing for an indication that memory validation has completed. In an embodiment, the determining at 640 is based on the memory validation agent, at 660, signaling completion of memory validation to other logic of the memory controller and/or a process executing on the processor.

After the determining at 640, method 600 may, at 645, copy one or more software instructions into locations memory—e.g. locations which the memory validation has transitioned from potentially invalid state to known-valid state. After being copied into memory at 645, software instructions—e.g. firmware interface code, OS code, boot code and/or the like—is available for much faster access by the processor, as compared to the processor retrieving such instructions from non-volatile storage.

Techniques and architectures for accessing computer memory are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
    a memory validation agent to operate in a computer platform, wherein the memory validation agent to couple to a processor of the computer platform, the memory validation agent including:
        write logic to access a memory device of the computer platform; and
        control logic to detect a signal sent to the memory validation agent, the signal indicating a transition of the computer platform from a first power state, where data in the memory device of the computer platform is allowed to degrade while the computer platform is in the first power state, the control logic further to cause the write logic to perform a plurality of writes each to a respective one of multiple addressable locations of the memory device, each of the plurality of writes in response to the detected signal, wherein the plurality of writes include an earliest write to the multiple addressable locations subsequent to the transition from the first power state.

2. The apparatus of claim 1, wherein the apparatus includes a memory controller, and wherein the memory validation agent resides in the memory controller.

3. The apparatus of claim 1, wherein the write logic to perform the plurality of writes comprises:
    the write logic to generate a plurality of write commands, wherein the memory validation agent to determine command information to include in respective ones of the write command, wherein determination of the command information is decoupled from operation of the processor.

4. The apparatus of claim 3, the memory validation agent to determine the command information includes the memory validation agent to determine a value to be written to a location of the memory device, wherein the memory validation agent to determine the value is independent of the processor specifying the value to the memory validation agent after the power state transition.

5. The apparatus of claim 4, wherein the memory validation agent to determine the value includes one of:
    a random number generator to provide the value; and
    the memory validation agent to access information describing a deterministic process for generating the value.

6. The apparatus of claim 4, wherein the memory validation agent to determine the command information further includes the memory validation agent to determine an error correction value corresponding to the value.

7. The apparatus of claim 3, wherein the memory validation agent to determine the command information includes the memory validation agent to determine an address of a location of the memory, wherein determination of the address is independent of the processor specifying the address to the memory validation agent after the power state transition.

8. A method comprising:
    detecting at a memory validation agent of a computer platform a signal sent to the memory validation agent, the memory validation agent coupled to a processor of the computer platform, the signal indicating a transition of the computer platform from a first power state, where data in a memory device of the computer platform is allowed to degrade while the computer platform is in the first power state; and
    performing, with the memory validation agent, a plurality of writes each to a respective one of multiple addressable locations of the memory device, each of the plurality of writes in response to the detected signal, wherein the plurality of writes include an earliest write to the multiple addressable locations subsequent to the transition from the first power state.

9. The method of claim 8, wherein performing the plurality of writes comprises:
    generating a plurality of write commands, including determining command information to include in respective ones of the write command, wherein determining the command information is decoupled from operation of the processor.

10. The method of claim 9, wherein determining the command information includes determining a value to be written to a location of the memory device, wherein determining the value is independent of the processor specifying the value to the memory validation agent after the power state transition.

11. The method of claim 10, determining the value includes one of:
    a random number generator providing the value; and
    accessing information describing a deterministic process for generating the value.

12. The method of claim 10, wherein determining the command information further includes determining an error correction value corresponding to the value.

13. The method of claim 9, wherein determining the command information includes determining an address of a location of the memory, wherein determining the address is independent of the processor specifying the address to the memory validation agent after the power state transition.

14. The method of claim 8, wherein the plurality of writes are before any loading of firmware interface code or boot code into the memory device after the power state transition.

15. A computer system comprising:
- a processor to perform one or more initialization processes in support of a transition by the computer system from a first power state;
- a memory validation agent coupled to the processor, the memory validation agent including:
  - write logic to access a memory device of the computer platform;
  - control logic to detect a signal sent from the processor to the memory validation agent, the signal indicating the transition by the computer platform from the first power state, where data in the memory device of the computer platform is allowed to degrade while the computer platform is in the first power state, the control logic further to cause the write logic to perform a plurality of writes each to a respective one of multiple addressable locations of the memory device, each of the plurality of writes in response to the detected signal, wherein the plurality of writes include an earliest write to the multiple addressable locations subsequent to the transition from the first power state; and
- a wireless network interface including one or more antennae to exchange a communication between the computer system and a network.

16. The computer system of claim 15, further comprising a memory controller, and wherein the memory validation agent resides in the memory controller.

17. The computer system of claim 15, wherein the write logic to perform the plurality of writes comprises:
- the write logic to generate a plurality of write commands, wherein the memory validation agent to determine command information to include in respective ones of the write command, wherein determination of the command information is decoupled from operation of the processor.

18. The computer system of claim 17, the memory validation agent to determine the command information includes the memory validation agent to determine a value to be written to a location of the memory device, wherein the memory validation agent to determine the value is independent of the processor specifying the value to the memory validation agent after the power state transition.

19. The computer system of claim 18, wherein the memory validation agent to determine the value includes one of:
- a random number generator to provide the value; and
- the memory validation agent to access information describing a deterministic process for generating the value.

20. The computer system of claim 17, wherein the memory validation agent to determine the command information includes the memory validation agent to determine an address of a location of the memory, wherein determination of the address is independent of the processor specifying the address to the memory validation agent after the power state transition.

* * * * *